United States Patent

Caillault et al.

Patent Number: 5,503,480
Date of Patent: Apr. 2, 1996

[54] SEALING DEVICE FOR PASSAGE OF FLUID THROUGH A BEARING, AND BEARING EQUIPPED WITH SAID DEVICE

[75] Inventors: Claude Caillault, Saint Roch; Christophe Bonnin; Christophe Houdayer, both of Tours; Christian Rigaux, Artannes sur Indre; Martha Berges; Eric Beghini, both of Tours; Marc DeFossez, Parcay Meslay; Olivier Message, Tours, all of France

[73] Assignee: SKF France, Clamart Cedex, France

[21] Appl. No.: 327,797

[22] Filed: Oct. 20, 1994

[30] Foreign Application Priority Data

Oct. 20, 1993 [FR] France .................. 93 12517

[51] Int. Cl.$^6$ .......................... F16C 33/76; B60C 23/00
[52] U.S. Cl. ............................ 384/477; 152/417; 277/75
[58] Field of Search ................................ 384/480, 477, 384/484, 486; 277/75, 72 R; 152/417

[56] References Cited

U.S. PATENT DOCUMENTS

| | | | |
|---|---|---|---|
| 4,733,707 | 3/1988 | Goodell et al. | 152/417 |
| 4,844,138 | 7/1989 | Kokubu | 152/417 |
| 4,932,451 | 6/1990 | Williams et al. | 152/417 |
| 5,080,157 | 1/1992 | Oerter | 384/480 X |

FOREIGN PATENT DOCUMENTS

| | | | |
|---|---|---|---|
| 362921 | 4/1990 | European Pat. Off. . | |
| 653815 | 3/1929 | France . | |
| 410723 | 1/1991 | Japan | 152/417 |

Primary Examiner—Thomas R. Hannon
Attorney, Agent, or Firm—Beveridge, DeGrandi, Weilacher & Young

[57] ABSTRACT

The sealing device (8) for the passage of a fluid between a rotating race and a non-rotating race of a bearing each penetrated by channels (6, 7) for the passage of the fluid, comprises a one-piece annular central body (9) of elastic material having a circular shoulder (10) for fixing to one of the races (1), and two main sealing lips (12) which mutually form an annular intermediate chamber (13) and which are in friction contact with the other race (2). The central body (9) is penetrated by at least one channel (15) communicating with the channels (6) of the race associated with the circular fixing shoulder, and also with the intermediate chamber, which communicates with the channels (7) of the other race, so that the fluid introduced into the channels of one of the races of the bearing passes through the central body in a leaktight manner and exits through the channels of the other race.

16 Claims, 2 Drawing Sheets

5,503,480

SEALING DEVICE FOR PASSAGE OF FLUID THROUGH A BEARING, AND BEARING EQUIPPED WITH SAID DEVICE

FIELD OF THE INVENTION

The present invention concerns a sealing device for the passage of a fluid between two parts, one of which is caused to rotate with respect to the other. In particular, the invention applies to a bearing equipped with a passage for a fluid which flows through the rotating and non-rotating races of the bearing.

BACKGROUND OF THE ART

Heretofore a European patent application 0 362 921 (SKF) described a bearing equipped with a sealing device mounted between two rows of balls and between the orifices arranged on the outer race and the orifices arranged on the inner race of the bearing, to allow for the passage of a fluid through the bearing. This bearing serves to establish communication between two vessels containing a pressurized fluid. The sealing device provides for the passage of the fluid through the bearing and also prevents the lubricant of the bearing, such as grease, from penetrating into the fluid passages in the bearing. However, the structure of such a device comprises many components which create substantial axial bulkiness, which may be incompatible with certain applications. Furthermore, the construction of such a device is relatively costly due to the number of distinct components that must be manufactured and assembled.

A routine application of this technique is designed for the monitoring and control of the pressure of the tires of a vehicle, the sealing device for the fluid passage being mounted in the bearings of the vehicle's wheel. Heretofore, in this particular application, U.S. Pat. No. 4,844,138 describes a device for the passage of air in a bearing comprising seals formed of a magnetic fluid which cooperates with magnetic rings to guarantee airtightness. Such a device is too sophisticated to be used in economic conditions compatible with mass production, as in the automotive field.

Heretofore, there have also been other devices for the passage of air through wheel hubs using a pair of seals to guarantee the tight passage of air between the rotating and fixed portions of the hub (see for example, European patent applications 0 204 085 and 0 208 540). The shape and arrangement of these seals in pairs creates a substantial axial bulkiness that is incompatible with certain applications and increases the cost of manufacture and installation of the device. Furthermore, the use of two distinct seals implies an effective system of axial immobilization of said seals, at the risk of their being displaced axially under the effect of the fluid pressure.

SUMMARY OF THE INVENTION

The present invention is directed to correcting the aforementioned drawbacks of the prior art by proposing a simple sealing device, economical to make and to install, and having an extremely small axial bulkiness, to permit its incorporation inside a bearing, particularly inside a wheel bearing of an automotive vehicle.

The sealing device is mounted between a rotating race and a non-rotating race of a bearing, to allow for the passage of a fluid between said races, each penetrated by channels for the passage of fluid. According to the invention, the sealing device comprises a one-piece annular central body of elastic material (for example, rubber or elastomer), having a circular shoulder for fixing to one of the races of the bearing, and two main sealing lips which together form an annular intermediate chamber and which are in friction contact with the other race of the bearing. The central body is penetrated by at least one channel which communicates with the channels of the race associated with the circular fixing shoulder, and with the intermediate chamber, which communicates with the channels of the other bearing race. The fluid introduced into the channels of one of the races of the bearing passes through the central body via its intermediate chamber and its channel in a leaktight manner, and then exits through the channels of the other bearing race.

The main sealing lips of the central body preferably have, in their friction zone, a coating having better friction, tightness and friction coefficient features, than the rest of the main lips. The product known by the name of Teflon is perfectly satisfactory for this purpose.

Advantageously, this annular central body also has two secondary sealing lips for the lubricant contained in the bearing. The secondary sealing lips serve to protect the friction zones of the main sealing lips against the lubricant of the bearing.

BRIEF DESCRIPTION OF THE FIGURES

The above and other objects and advantages of the invention will be apparent from the following detailed description of a few embodiments, which are in no way limitative, and are taken in conjunction with the accompanying drawings wherein.

BRIEF DESCRIPTION OF THE EMBODIMENTS

Figure 1:
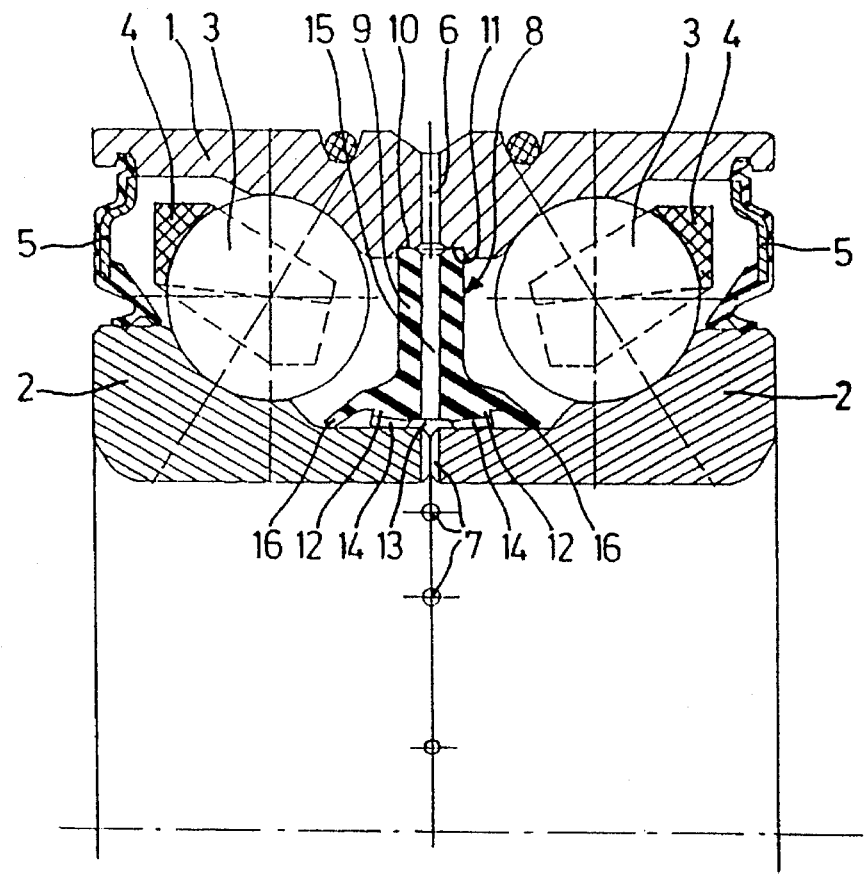
FIG. 1 is a partial axial cross-section of a bearing equipped with a sealing device according to a first embodiment of the invention.

The bearing shown in FIG. 1 comprises an outer race 1, an inner race 2 formed by two half-races adjoined axially, and two rows of bearing balls 3 which are spaced circumferentially by cages 4. The outer race of 1 and the inner race 2 can rotate with respect to each other. The outer race 1 can be fixed or rotating.

The bearing is protected from the surrounding medium by two annular lateral seals 5. Positioned in a radial plane between the two rows of balls 3 are several radial outer channels 6 passing through the outer race 1 of the bearing, and several radial inner channels 7 passing through the inner race 2 of the bearing. In the annular space formed by the outer 1 and inner 2 races and the two rows of balls 3, a sealing device 8 is mounted to allow the passage of a fluid between the outer 6 and inner 7 channels of the bearing.

The sealing device 8 comprises an annular central body 9 which has an outer circular fixing shoulder 10 embedded in an annular slot 11 arranged in the neighborhood of the outer channels 6 of the outer race 1. The central body 9 has two main inner sealing lips 12 which define mutually an annular intermediate chamber 13 communicating with the inner channels 7. The friction zones 14 of the main sealing lips 12 are coated with an anti-friction material such as Teflon. Several radial channels 15 distributed circumferentially pass through the central body 9 and connect the outer channels 6 of the outer race 1 with the intermediate chamber 13. Thus the passage of the fluid (for example, air) between the outer 6 and inner 7 channels is made leaktight due to the particularly compact structure Of the annular central body 9.

In order to protect the main sealing lips 12, the central body 9 comprises two secondary outer sealing lips 16 in friction contact with the inner race 2, these secondary sealing lips 16 prevent the grease lubricating the bearings from entering into the friction zones 14 of the main lips 12.

Figure 2:
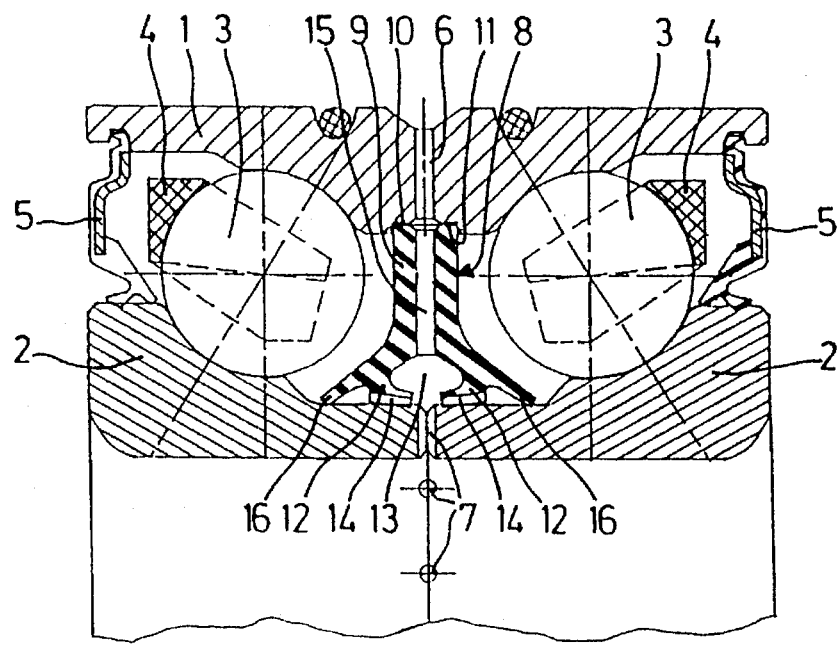
FIG. 2 is a similar view to FIG. 1 showing a second embodiment of the invention.

The embodiment shown in FIG. 2 differs from the one described above in relation to the main body 9 of the field connecting device 8. In this embodiment, the main sealing lips 12 are more flexible and the annular intermediate chamber 13 has a larger cross-section than the embodiment previously described.

Figure 3:
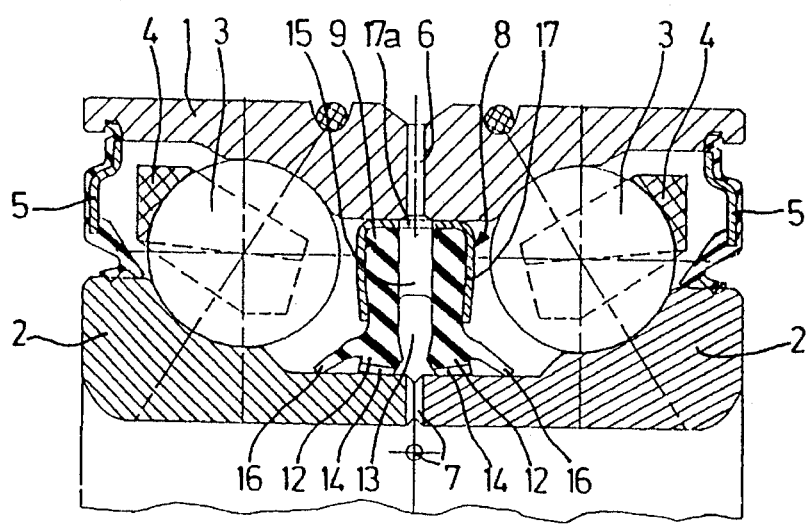
FIG. 3 is a similar view to FIG. 1 showing a third embodiment of the invention.

FIG. 3 shows another embodiment of the invention with the sealing device 8 comprising, in addition to the annular central body 9, a U-section annular metallic reinforcement 7, permitting the axial force fit of the device 8 on a smooth cylindrical surface of the outer race 1. Such a structure can be used, for example, in applications with the passage of a fluid under a relatively high pressure, the metallic reinforcement 17 contributing to the rigidification of the central body 9. It goes without saying that the metallic reinforcement 17 has perforations 17a facing the radial channels 15 of the central body 9 in order to permit the passage of fluid. In this embodiment, the annular intermediate chamber 13 has an even larger radial dimension than the two embodiments previously described.

Figure 4:
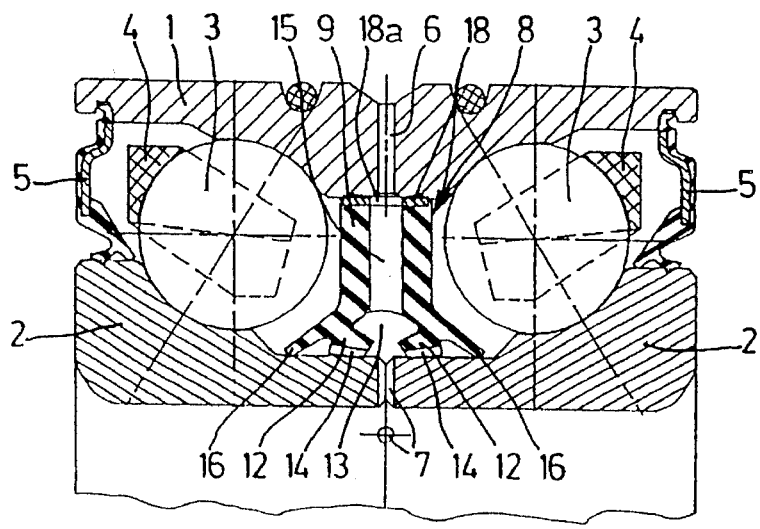
FIG. 4 is a similar view to FIG. 1 showing a fourth embodiment of the invention.

In the embodiment shown in FIG. 4, the central body 9 is duplicate molded on a tubular metallic insert 18 permitting the axial fit of the sealing device 8 in a smooth cylindrical surface of the outer race 1 of the bearing. The metallic insert 18 has perforations 18a to establish communication between the outer channels 6 of the outer race 1 and the inner channels 15 of the central body 9 of the sealing device 8.

The sealing devices 8 have a symmetrical structure about a radial plane passing through the outer 6 and inner 7 radial channels.

The main fluid sealing lips 12 in the embodiments shown in FIGS. 1 and 3 are pressurized on their corresponding friction surface 14 by an assembly of the device 8 between the outer 1 and inner 2 races of the bearing with radial prestress. In FIGS. 2 and 4, the main fluid sealing lips 12 are pressurized on their corresponding friction surface 14 partly by an assembly of the device 8 between the outer 1 and inner 2 races of the bearing with radial prestress, but also by the action of the fluid pressure on internal part of the main sealing lips 12, which are curved as they come together.

The sealing devices 8 can in no circumstances undergo accidental axial displacements under the effect of the pressure of the fluid passing through it, as may be the case for a sealing device with two separate seals, because the fluid pressure applies inside the central body 9 and the resulting internal axial forces are balanced.

Figure 5:
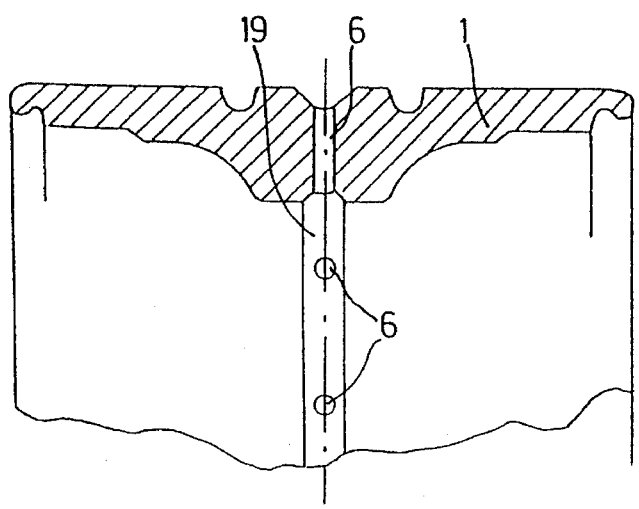
FIG. 5 is a partial axial cross-section of the outer race of the bearing of FIGS. 3 and 4.

Advantageously, the outer race 1 of the bearing which serves to fix the sealing device 8 has a circular groove 19 (FIG. 5) connecting the radial outer channels 6 to enable the fluid to pass through the radial outer channels 6 and the radial inner channels 15 of the central body 9 of the device 8, without any need to angularly index the device 8 with respect to the outer race 1 during the assembly operation.

This annular groove 19 is already shown in the aforementioned FIGS. 1 to 4.

We claim:

1. A sealing device (8) for the passage of the fluid between a rotating race and a non-rotating race of a bearing, each penetrated by channels (6, 7) for the passage of the fluid, comprising a one-piece annular central body (9) of elastic material having a circular shoulder (10) for fixing to one of the rotating or non-rotating races (1), and two main sealing lips (12) which mutually form an annular intermediate chamber (13), which are in friction contact with the other race (2), the central body (9) being penetrated by at least one channel (15) which communicates with the channels (6) of the race (1) associated with the circular fixing shoulder, and also with the intermediate chamber, which communicates with the channels (7) of the other race, so that the fluid introduced into the channels of one of the races of the bearing passes through the central body and the annular intermediate chamber in a leaktight manner and exits through the channels of the other race.

2. The device of claim 1 wherein the main sealing lips (12) comprise in their friction zone (14) a coating which has better friction, tightness and friction coefficient features than the rest of the main lips (12).

3. The device of claim 1, wherein the central body (9) comprises two secondary sealing lips (16) in friction contact with the race (2) associated with the main sealing lips to prevent the lubricant contained in the bearing from entering into contact with the friction zones (14) of the main sealing lips (12).

4. The device of claim 1, wherein the annular central body (9) is symmetrical about a radial plane, the channels (6, 7 and 15) of the races of the bearing and of the central body lying in the plane of symmetry.

5. The device of claim 4, comprising a tubular metallic insert (18) on which the central body (9) is duplicate molded, the metallic insert allowing the axial fit of the central body on a cylindrical surface of the race (1) associated with the circular shoulder (10) for fixing the central body.

6. The device of claim 1, wherein the main lips (12) are curved as they come together, so that the internal portion of said main lips is pressurized on their friction surface partly by the action of the pressure.

7. A bearing comprising an outer race (1), an inner race (2) both penetrated by channels (6, 7) for the passage of a fluid, which is equipped with a sealing device (8) according to one of the preceding claims, to allow the passage of the fluid between the channels arranged in the races.

8. The bearing of claim 7, wherein, in the race (1) associated with the assembly of the sealing device (8), an annular groove (19) is arranged, into which the channels (6) of said race and at least one channel (15) of the central body (9) of the device terminate.

9. The bearing of claim 8, wherein the outer race has an annular slot for the assembly of the fixing shoulder (10) of the central body of the device.

10. The bearing of claim 7, wherein the outer race (1) has an annular slot (11) for the assembly of the fixing shoulder (10) of the central body (9) of the device.

11. The device of claim 4, having a U-section annular metallic reinforcement for rigidifying the circular body and allowing the axial force fit of the central body on a cylindrical surface of the race which receives the circular shoulder.

12. The device of claim 2, wherein the main lips (12) are curved as they come together, so that the internal portion of said main lips is pressurized on their friction surface partly by the action of the pressure.

13. The device of claim 2, wherein the central body comprises two secondary sealing lips in friction contact with the race associated with the main sealing lips to prevent the lubricant contained in the bearing from entering into contact with the friction zones of the main sealing lips.

14. The device of claim 2, wherein the annular central body is symmetrical about a radial plane, the channels of the races of the bearing and of the central body lying in the plane of symmetry.

15. The device of claim 14, having a U-section annular metallic reinforcement for rigidifying the circular body and allowing the axial force fit of the central body on a cylindrical surface of the race which receives the circular shoulder.

16. The device of claim 14, comprising a tubular metallic insert on which the central body is duplicate molded, the metallic insert allowing the axial fit of the central body on a cylindrical surface of the race associated with the circular shoulder for fixing the central body.

* * * * *